April 18, 1967 H. S. FEDER 3,315,232
RESONANT CIRCUIT TIMED TRANSLATOR MATRIX EMPLOYING TRANSISTOR GATES
Filed May 16, 1962 2 Sheets-Sheet 1

INVENTOR
H. S. FEDER
BY
[signature]
ATTORNEY

April 18, 1967 H. S. FEDER 3,315,232

RESONANT CIRCUIT TIMED TRANSLATOR MATRIX EMPLOYING TRANSISTOR GATES

Filed May 16, 1962 2 Sheets-Sheet 2

INVENTOR
H. S. FEDER
BY
Charles Scott Phelan
ATTORNEY 3,315,232

RESONANT CIRCUIT TIMED TRANSLATOR MATRIX EMPLOYING TRANSISTOR GATES

Herbert S. Feder, Fanwood, N.J., assignor to Bell Telephone Laboratories, Incorporated, New York, N.Y., a corporation of New York Filed May 16, 1962, Ser. No. 195,203
18 Claims. (Cl. 340—166)

This invention relates to electrical switching systems and, more particularly, to time division telephone switching systems including self-timing matrix translators with coordinate input transistor drive gates.

In present day high speed information handling systems, a practice employed in transferring information from one locality to another is time sharing or time division multiplexing, which practice permits the simultaneous exchange of information between connecting pairs of a plurality of terminals over a common communication link. Time division multiplexing requires that each terminal or each pair of terminals in communication be assigned a cyclically recurring discrete time interval or time slot during which information may be sampled, and transferred between the communicating terminals. In the interval between appearances of the time slot assigned to a particular terminal or pair of terminals, the common communicating link is available to other communicating terminals. By sampling at a sufficiently rapid rate, an accurate reproduction of the information transmitted from one terminal of a communicating pair may be formed at the other terminal of the pair.

By employing a common communication link to conserve expensive transmission facilities a plurality of subscriber lines may be interconnected in one remote area with a significant reduction in wiring problems and expenses. A time division system employing a common communication link for all subscribers in a single remote area is described in United States Patent 3,225,144 of R. C. Gebhardt, W. L. Shafer, Jr., A. E. Spencer, Jr., W. N. Toy, F. S. Vigliante, R. D. Williams and O. H. Williford.

In the Gebhardt et al. system telephone numbers of communicating pairs of parties are stored and utilized during successive time slots to activate translators which generate signals for controlling appropriate line gates. These line gates may advantageously be of the type described in my Patent No. 3,086,083 which issued April 16, 1963, and wherein a gate is described which comprises two PNPN semiconductive diodes set in a normally high impedance state to signals in a transmission circuit. These PNPN diodes are settable to a low impedance state in response to a control voltage of appropriate magnitude to form a low impedance bilateral information handling line gate. Line gates of the type just described interconnect, under appropriate control signals, each pair of parties in their particular time slot. The translators which control these line gates must respond with consistent accuracy, and their output signals must reflect similar accuracy both in time duration and pulse shape. Since the translators conveniently take the form of matrix networks the problem of crosstalk, or transient step voltages, among the various matrix cross-point circuits must be considered. Limitations on permissible crosstalk are much more severe in a matrix network for a translator in a time division multiplex system than they are for ordinary code translation circuits because of the required time slot precision in multiplex systems.

Prior art translators have employed various trigger circuits and devices to obtain an accurately controlled cross-point matrix function, but such circuits generally require relatively expensive hardware including a two-phase clock source. Some such circuits are also highly susceptible to crosstalk within the matrix.

It is a general object of my invention to translate address signals in a time division communication system into pulses which are capable of activating communicating subscriber lines connected to a common communication link in a highly reliable and efficient manner.

It is another object of my invention to translate spike input pulses of variable duration into accurate half-cycle pulses of predetermined time duration.

It is a further object of my invention to generate a single, accurate translator output in respense to the coincidence of input signals which may not, however, be initiated simultaneously at the translator input terminals.

These and other objects are obtained in one specific illustrative embodiment in a time division multiplex communication system of the type described in the aforementioned Gebhardt et al. patent application and wherein line gates are controlled by new and novel matrix translators. These translators, in accordance with my invention, are self-timing and are provided with improved, coordinate, input-lead, drive gates which are not susceptible to spurious triggering by crosstalk signals within the matrix.

It is a feature of my invention that each translator in a time division communication system includes a single timing circuit connected to the translator for regulating the translator output signals.

It is another feature of my invention that translator coordinate input gates are adapted to assume a conductive condition for a time duration longer than the input trigger pulses applied thereto, which conductive condition is controlled by a timing circuit that regulates both the duration and the shape of the translator output pulses.

It is yet another feature of my invention that input signals of varying shape and duration are translated to half-cycle sine wave pulses of precise predetermined duration.

It is yet another feature of my invention that translator gates employ a sustaining circuit which is operative upon receipt of an input signal to maintain the translator gate in a conductive condition for a duration determined by the translator matrix timing circuit.

It is a further feature of my invention that crosstalk is reduced by including in each translator gate a cancellation circuit which reduces the tendency of inherent interelectrode capacitance in the gate to permit spurious triggering of the gate before a trigger pulse is present at the input of the translator gate.

It is yet a further feature of my invention that the cancellation circuit in each translator gate includes a bridge circuit having a pair of diagonal terminals and a coil and inherent interelectrode capacitance connected between the terminals in one arm of the bridge circuit and another coil and capacitance of even value connected in the other arm of the bridge circuit.

A complete understanding of these and other features of my invention may be gained from consideration of the following detailed description, together with the accompanying drawing, in which.

Figure 1:
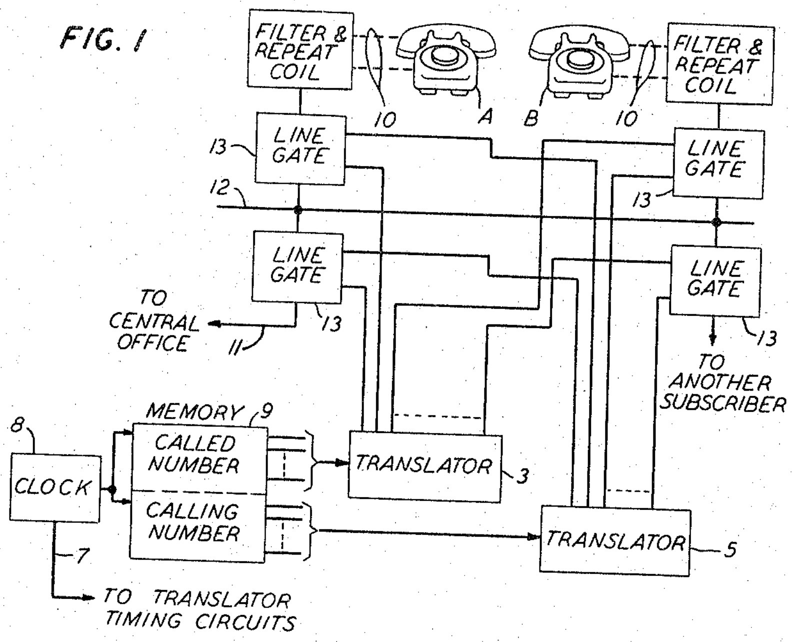
FIG. 1 is a schematic representation in block form of a time division telephone system in which a translator arrangement in accordance with this invention may be employed.

Turning now to the drawings, the basic elements of a time division telephone communication system in which my invention may be incorporated are depicted in FIG. 1. The system is disclosed in full detail in the aforementioned Gebhardt et al. patent application. As shown in FIG. 1, a plurality of subscriber lines 10 (only two of which are shown connected to two subscriber stations A and B) are located in a single remote area and are capable of being either selectively connected together through common communication link 12 or being connected to other subscribers in a different remote area through the lead 11 to central office in accordance with appropriate signals delivered from translators 3 and 5. The lead 11 schematically represents an information trunk circuit. All the equipment depicted in FIG. 1 including translators 3 and 5, memory unit 9, and clock source 8 are located in an area remote from a central office but connected through the aforementioned information trunk to the central office which delivers control signals to the remote area. The nature of these signals, not pertinent to an understanding of this invention, may be obtained in detail from the aforementioned Gebhardt et al. application.

The unit 9 is a so-called word organized sequence access memory which stores the numbers of the various communications to be made. The number of words stored corresponds to the number of subscribers that may converse simultaneously over the common communication link 12 during one complete cycle of cyclically recurring discrete time intervals. As shown in FIG. 1, the called and calling numbers are stored in separate halves of memory 9. Each of the called and calling numbers is in eight-digit binary form, and the two types of numbers are stored in different halves of memory 9. A clock source 8, which advantageously may be a standard ring-counter oscillator is employed to pulse, in sequence, each word stored in each half of the memory 9. Clock source 8 also pulses the translator timing networks, to be described in detail hereinafter, concurrently with each pulse delivered to the words stored in memory 9. When a pulse is applied by clock source 8 to a particular word in the memory unit 9, two eight-digit binary numbers corresponding to the called and calling parties are read out of the memory halves into two translators 3 and 5, respectively. The translators are binary to one-out-of-N type which convert the binary number into a signal which is applied to two corresponding line gates in one particular time slot. The time required for a complete scan by clock source 8 of the memory unit 9 corresponds to the time base. The time base, which is constantly recurring, is divided, in turn, into the distinct time intervals or time period slots mentioned hereinbefore. As the memory unit 9 is repetitively scanned, called and calling numbers are delivered to translators 3 and 5, respectively, and are converted into called and calling line gate activating pulses. These pulses are delivered to the line gates associated with subscriber lines 10, thus closing communication paths, for example, between subscriber stations A and B, over common communication link 12 in accordance with basic time division principles.

Circuitry for obtaining information as to the condition of a subscriber line 10, e.g., busy or idle, or seeking service, as well as circuitry for setting up new connections by writing or erasing numbers in the memory 9, is provided in a time division communication system. This circuitry detail may be obtained from the circuit description in the aforementioned Gebhardt et al. patent application. Inasmuch as an understanding of this circuitry is not necessary for an understanding of applicant's invention, no effort will be made herein to describe or disclose the equipment necessary to accomplish these and other general system functions.

Figure 2:
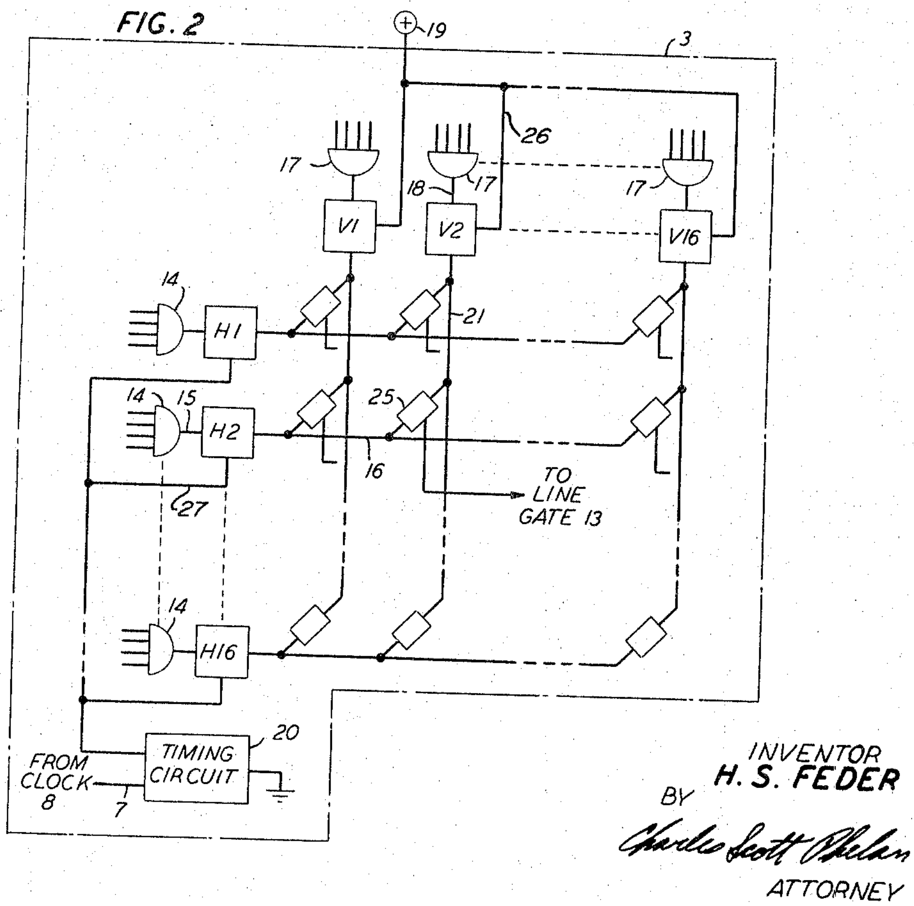
FIG. 2 is a schematic representation in block form of a translator matrix embodied in the arrangement of FIG. 1.

The operation of the translator matrices 3 and 5 shown in FIG. 1, in accordance with my invention, may be better understood with reference now to FIG. 2 which shows translator 3 of FIG. 1 in more detail. As shown in block diagram form in FIG. 2, translator 3 employs a first plurality of gates H1, H2 . . . H16. These gates, associated with 16 horizontal coordinate matrix leads, will be referred to hereinafter as horizontal gates. A second plurality of gates V1, V2 . . . V16, hereinafter referred to as vertical gates, are associated with 16 vertical coordinate matrix leads, respectively, and are connected in common to a source 19 of positive potential 19. Potential source 19 is schematically represented by a circle and the positive potential sign but of course is understood to be any suitable source which has one terminal grounded. Timing circuit 20 is connected in a common ground return path for all horizontal gates of the matrix.

The operation of the circuit shown in FIG. 2 may best be appreciated by assuming that a cross-point 25 is to be activated. This is accomplished by the selective operation of horizontal gate H2 and vertical gate V2. An eight-digit binary signal representing the matrix address of the cross-point 25 is delivered from the called-number half of memory unit 9. This eight-digit signal is divided into two groups of four digits each since the activation of cross-point 25 requires the enablement of two translator gates H2 and V2. These digit groups are applied, respectively, to logic AND gates 14 and to logic AND gates 17. Each of the AND logic gates is advantageously of the type standard in the art which is responsive to a different combination of binary coded signals which must appear on the AND gate input leads before the logic gate will be enabled. Each gate 14 is connected by a control lead, e.g., lead 15, to one horizontal gate input; and each gate 17 is similarly connected, e.g., by a control lead 18, to one vertical gate input.

Each of the four-digit groups satisfies the logic conditions for one of the AND gates 14 (associated with horizontal gate H2) and 17 (associated with vertical gate V2). The output control pulses from gates 14 and 17 are delivered by the control leads 15 and 18, respectively, to their associated gates H2 and V2. The pulses delivered by the logic gates 14 and 17 are sufficient in magnitude and duration to establish a conductive condition in gates H2 and V2 as will be described in detail hereinafter with respect to FIG. 3.

Cross-point 25, as shown in block form in FIG. 2, interconnects a lead 21 from gate V2 to a lead 16 from gate H2 to complete a circuit from source 19 to ground through gates V2 and H2 and timing circuit 20. Although other cross-points in the matrix are individually connected to the lead 21 and the lead 16, only cross-point 25 interconnects the leads 16 and 21. Thus, with the enablement of gates H2 and V2, only cross-point 25 is established in an active circuit with these two translator gates. Activating control pulses are delivered from clock source 8 depicted in FIG. 1 via lead 7 to the translator timing circuit 20. The timing circuit 20 will be described in detail hereinafter in connection with FIG. 3. Briefly, however, timing circuit 20 produces a signal of desired shape and time duration, and that signal is applied to the circuit including the selected cross-point 25. As described hereinbefore, the pulse produced in the circuit of cross-point 25 must be accurately timed for a proper time division operation inasmuch as this pulse controls the multiplex conductive interval of a line gate 13 in FIG. 1. In addition, it is advantageous for the pulse in the circuit of cross-point 25 to have a half sine wave shape, which pulse shape is desirable for information transfer in a time division system.

It should be noted that the description given hereinbefore was based on the assumption that both gates of the selected pair of translator gates H2 and V2 were activated simultaneously. In practice, however, such an ideal situation does not exist.

Practically speaking, one gate of the selected pair of gates is activated prior to the activation of the other gate. In such a situation, a possibility exists that several paths may be wrongly established through the translator matrix. For example, translator gate H2 may, it is assumed, be activated prior to the delivery of activating pulses to translator gate V2 and timing circuit 20. In the absence of an activating pulse from clock source 8 (FIG. 1), the timing circuit 20 represents a low impedance path to ground for direct current signals, as will be described hereinafter. With translator gate H2 in a low impedance condition, it is apparent that the lead 16 is approximately at ground potential and thus the output leads of each of the vertical gates are effectively connected to ground through this ground return path which includes all cross-points connected to the horizontal coordinate associated with gate H2. Potential source 19, in turn, is connected to gate V2 by lead 26 and in addition is connected to each one of the remaining vertical gates. It is necessary therefore that none of the vertical gates break down in response to the voltage which is suddenly established across each of them and its corresponding cross-point as such a breakdown would cause all 16 cross-points in the horizontal row associated with gate H2 to be activated. Such a result, of course, would place 16 subscriber stations in connection with common transmission link 12 during one time interval, thus disrupting totally the time division operation. My translator invention assures that the possibility just described cannot take place by employing novel translator gates which will not respond to the sudden voltage condition described hereinbefore.

Figure 3:
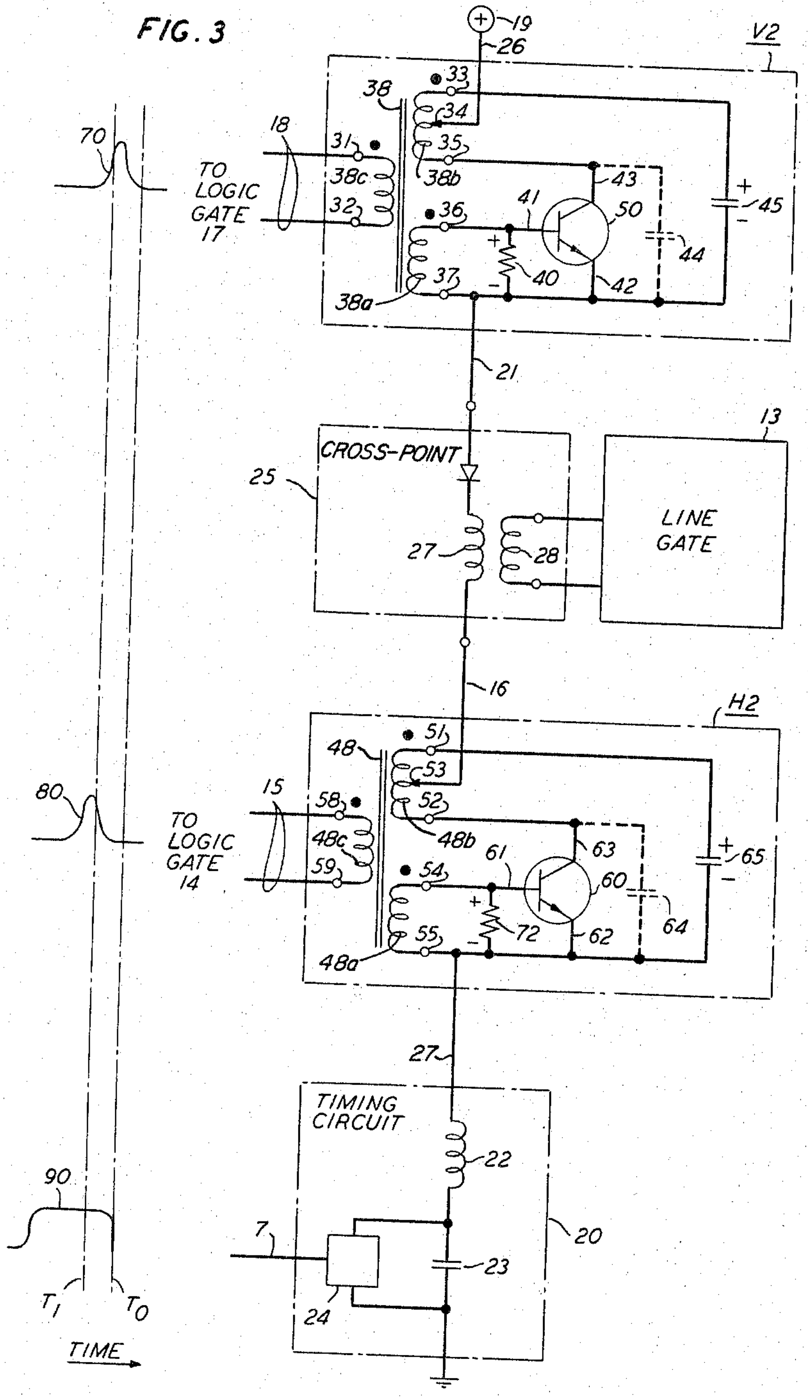
FIG. 3 is a detailed schematic representation of a portion of the embodiment in the arrangement of FIG. 2.

The operation of the translator matrix depicted in FIG. 2 may best be appreciated in accordance with my invention by reference to FIG. 3. FIG. 3 shows only one pair of translator gates H2 and V2 in detail, although it is understood that the various remaining horizontal and vertical gates shown in FIG. 2 are of similar type and are eliminated from FIG. 3 solely for clarity of explanation. It is readily apparent that translator gates V2 and H2 are identical and thus attention will be directed first mainly to translator gate V2.

Translator gate V2 comprises a three electrode transistor 50, shown as an NPN type. Transistor 50 advantageously may also be of the standard PNP type provided the appropriate circuit polarities are reversed. A transformer 38 having a secondary winding 38*a* with terminals 36, 37 is connected across the base electrode 41 and emitter electrode 42 of transistor 50. A resistor 40 is connected in a transistor biasing path in parallel with the winding 38*a*. In addition, capacitor 45 and a second transformer winding 38*b* including terminals 33, 35 are connected in series across the collector 43 and emitter 42 of transistor 50.

The four-input AND gates 17 described hereinbefore with respect to FIG. 2 terminate in a transformer control winding 38*c* including terminals 31, 32, which transformer winding is inductively coupled to the other two windings 38*a* and 38*b* of transformer 38. An adjustable tap 34 on the winding 38*b* is connected to lead 26 to positive potential source 19 which, as described hereinbefore, has one terminal (not shown) grounded. One current path exists through the tapped transformer winding section between terminals 34, 33, capacitor 45, lead 21, cross-point 25, lead 16, a similar path in gate H2 (winding portion between terminals 53, 51, and capacitor 65), lead 27, and timing circuit 20 to ground. Thus, prior to activation of either of translator gates V2 or H2, capacitors 45 and 65 will be charged to a voltage slightly less than one-half of potential of source 19.

The pulses 70 and 80 are applied on control leads 18 and 15, respectively, in accordance with the timing chart shown at the left of FIG. 3 to the control winding 38*c* and a similar winding 48*c* in gate H2. The timing chart at the left of FIG. 3 illustrates the practical situation in which one of the timing pulses precedes the other in time. For example, timing pulse 70 precedes timing pulse 80 and thus translator gate V2 will be activated prior to activation of translator gate H2.

Winding 38*c* is inductively coupled to winding 38*a* in accordance with the polarity directions shown by the placement of the dots adjacent to the windings. Thus, when positive-going input pulse 70 appears at winding 38*c* of gate V2 a positive potential is established at terminal 31 and is inductively coupled as a positive potential at terminal 36. Inasmuch as a closed loop consisting of winding 38*a* and resistor 40 exists, the positive potential at terminal 36 establishes current flow through resistor 40. A biasing voltage of polarity shown is thus established across resistor 40. This biasing voltage establishes current flow in transistor 50 from base 41 to emitter 42; and, at this instant of the operation, transistor 50 may be considered as a closed common emitter switch.

The impedance between collector 43 and emitter 42 of transistor 50 is reduced as a result of the biasing action described hereinbefore, and current flows from potential source 19, through lead 26, winding section between terminals 34, 35, and the low impedance path through collector 43 and emitter 42 of transistor 50. At this same instant, capacitor 45, previously charged with polarity shown, disharges through the low impedance between collector 43 and emitter 42 of transistor 50. The discharge current from capacitor 45 is in a direction which aids the turning-on process of transistor 50, and thus the transistor is rapidly turned fully on. With transistor 50 fully on, a low impedance path is established from potential source 19 to translator crosspoint 25.

Digressing for a moment in order to fully appreciate the importance of the feature of my invention, it should be noted that most semiconductive gates or switches known in the art possess high interelectrode capacitance. For example, the inherent interelectrode capacitances of transistor 50 and the corresponding transistor 60 in gate H2 are depicted in FIG. 3 by capacitors 44 and 64, which are shown in dashed lines across the collector and emitter electrodes of these transistors. A possibility exists that devices such as transistors 50 and 60 would be driven into a conductive state as a result of current flow through their inherent interelectrode capacitance, unless some means is provided for preventing such as possibility.

In accordance with one feature of my invention, each translator gate does not respond to the voltage step described hereinbefore since novel cancellation paths exist in each translator gater, which paths prevent the possibility of sneak biasing voltage effects from appearing across the translator gates. The effect that an inherent capacitance has in a translator gate such as gate H2 may be appreciated by assuming, for the purposes of illustration only, that lead 16, rather than being adjustably tapped at tap 53 of winding 48*b* as shown, is permanently connected to winding terminal 51. In addition assume that capacitor 65 is not present in the translator gate circuit. Under such an assumption, at the instant that gate V2 is enabled, a path for current buildup through the entire winding 48*b* and inherent capacitance 64 would exist. In accordance with the polarity indications shown on windings 48*a*, 48*b* and 48*c*, the resulting positive potential from source 19 appearing at terminal 51 would be inductively coupled as a positive potential at terminal 54. Current flow through the closed loop comprising winding 48*a* and resistor 72 would establish, across resistor 72, a sneak bias- ıg voltage sufficient to turn on transistor 60 even in ıe absence of an input pulse 80. Adjustable tap 53 nd capacitor 65, and similar circuit elements in each of ıe remaining translator gates, are employed to cancel ut the sneak biasing voltage in a novel manner to be escribed hereinafter.

It is recognized in the art, that the interelectrode capac- ance for any particular type of transistor may be de- ermined by measurements. Advantageously, in accord- nce with the principles of my invention, capacitor 65 is hosen to have a value substantially equal to the capaci- ance 64 in gate H2; and similarly capacitor 45 is chosen ubstantially equal to capacitance 44 in gate V2. Capaci- or 65 in gate H2, is arranged effectively in parallel with apacitance 64 by having one plate of capacitor 65 con- ected to emitter 62 of transistor 60 and the remaining late connected to terminal 51 as shown. It is apparent hat the tap 53 on winding 48*b* establishes two separate aths for current flow within gate H2 from potential ource 19. Tap 53 is adjusted so that the current flowing hrough the winding portion between terminals 53, 52 and he capacitance 64, and the current flowing through the vinding portion between terminals 53, 51 and the capaci- or 65, are in opposite directions and are equal in magni- ude. However, it should be recognized that any position of tap 53 will be satisfactory provided that the impedances of the two described paths are essentially equal so that he currents through winding portions between terminals 53, 51 and between terminals 53, 52 induce essentially equal and opposite voltages into winding 48*a* so that no net biasing voltage appears across resistor 72.

The circuit operation just described may be conven- iently termed as a cancellation effect since the opposing currents through the two halves of winding 48*b* produce equal and opposite voltages at winding 48*a* which cancel each other and thus no net biasing voltage across tran- sistor 60 exists. There is no tendency for transistor 60 to become conductive until logic drive pulse 80 appears across the control winding 48*c*. When the drive pulse 80 appears across control winding 48*c*, transistor 60 will become conductive in the manner described hereinbefore with respect to transistor 50 of translator gate V2.

The operation as thus far described, has resulted in translator gates V2 and H2 being placed in a conductive condition by the application of control pulses 70 and 80, which conduction conditions, of course, complete a path for current flow from potential source 19 to timing circuit 20. The timing circuit 20 in accordance with another feature of my invention comprises a series resonant tuned circuit including inductor 22 and capacitor 23 connected in series. Switch 24, which is represented schematically in block form, may advantageously be any suitable switch capable of activation by the appearance of a control pulse such as 90 in FIG. 3. Switch 24 is a normally closed switch which maintains capacitor 23 in a direct shunted condition so that no charge exists on capacitor 23 prior to the opening of switch 24. As shown in the timing chart at the left of FIG. 3, pulse 90 at time $T_0$ is applied slightly prior to the application of triggering pulses 70 and 80. There is no difficulty in regulating the time of application of pulse 90 to circuit 20 since the pulse is applied directly to circuit 20 by lead 7 from clock source 8 (FIG. 1) for each step taken by clock 8. There is thus little chance of time delay for pulse 90 as compared with pulses 70 and 80 since these pulses are conducted through memory 9, the AND logic gates 14 and 17, control leads 15 and 18. Although pulses 70 and 80 are shown dis- placed in time it is to be noted that the total time dis- placement through the memory 9 and the logic gate is less than the width of these pulses and thus even in the greatest instance of time displacement between pulses 70 and 80, these pulses slightly overlap as shown by dashed line at time $T_1$ in FIG. 3.

Pulse 90 (FIG. 3) opens switch 24 and removes the direct shunt from across capacitor 23. With switch 24 open and translator gates V2 and H2 closed, the potential from source 19 appears across winding 27 in cross-point 25 and also appears across inductor 22 of timing circuit 20. The inductance of winding 27, which is the driving or primary winding of cross-point 25 is chosen to be much greater than the inductance of inductor 22 in the timing circuit 20. Thus, essentially all the potential from source 19 appears initially across winding 27 of cross-point 25. Accordingly, the driven or secondary winding 28 of cross-point 25 is impressed with a high positive potential. Winding 28 is connected, as described hereinbefore with respect to FIG. 2, to a particular line gate 13 of the type referred to hereinbefore in my previously mentioned patent. Line gate 13 is connected between the common communication link 12 and a communicating subscriber station such as station A shown in FIG. 1. The potential across winding 27 is of sufficient magnitude that the volt- age induced into winding 28 causes line gate 13 to change from a high impedance state to a low impedance state. The resulting low impedance in line gate 13, in turn, is re- flected back into cross-point switch 25 by standard trans- former action.

As described earlier, normally the inductance of wind- ing 27 is much greater than inductor 22 in the timing circuit 20. However, when the low impedance (essen- tially zero) from line gate 13 is reflected back into wind- ing 27 by winding 28, winding 27, for all practical pur- poses, is short-circuited in the translator circuit and the time constant for the entire translator becomes controlled by inductor 22 in timing circuit 20. Inasmuch as switch 24 is open, capacitor 23 of timing circuit 20 starts to charge in series with the inductor 22 and what is com- monly referred to as a series resonant circuit oscillation starts to take place. This series resonant oscillation will continue through a half sine wave duration which also produces a half sine wave output across the winding 28 of cross-point 25. The pulse produced across winding 28 maintains the required sustaning voltage necessary to keep cross-point 25 and, in turn, line gate 13 open for its predetermined time slot interval. Thus, in accordance with the basic time division principles described herein- above, the period of the half sine wave output produced by the series resonant timing circuit 20 is chosen to be equal to the time slot interval of time division line gate 13.

The self-timing operation just described in my translator matrix produces several beneficial results in addition to those described hereinbefore. For example, the self- timing operation reduces the influence of the storage and turn-off times of semiconductor devices of the driven line gate 13 and further allows exact control over the con- ductive interval of the line gates by the translator matrix. It should further be noted in the instant translator circuit that the interval during which an output pulse is delivered across winding 28 of cross-point 25 is controlled by the series resonant timing circuit 20 and is not controlled by the duration of the control pulses 70 or 80.

Transistors 50 and 60 of translator gates V2 and H2 are maintained in a conductive condition after the logic driving pulses 70 and 80 have terminated by the sus- taining effect of the unique transformer winding arrange- ments in the translator gates. This sustaining effect exists as a result of the transformer inductance action among windings 38*b* between terminals 34, 35, and windings 38*a* and 38*c* in gate V2, and similar action in gate H2. Thus, after transistor 50 is first biased into conduction as de- scribed hereinbefore, and as long as current is flowing at a changing rate with respect to time, the transformer fields thus produced maintain transistors 50 and 60 in a nor- mally conductive condition.

On the other hand, when the timing circuit 20 has completed one half-cycle of oscallation, the normal action for the resonant timing circuit would be to reverse the current direction on the next half-cycle which would, in turn, reverse all the polarities on the translator gate windings. Obviously, the transistors 50 and 60 cannot conduct in a reverse current condition and this action by the timing network establishes a high reverse bias which assures that transistors 50 and 60 will become and remain nonconductive. Input pulse 90, of a predetermined duration slightly in excess of the half-cycle time interval, reestablishes switch 24 in a low impedance condition to shunt the charge off from capacitor 23 and thus place the translator circuit in a ready condition for the next address signal delivered from memory 9 (FIG. 1).

In summary then, my invention comprises a translator matrix which controls subscriber line gates requiring a driving cross-point to produce a half-cycle pulse of sine wave current of precise time duration. Further, in accordance with the principles of my invention, a matrix translator is provided with improved coordinate input lead drive gates which cannot be spuriously triggered by crosstalk signals within the matrix. Each drive gate in the matrix includes a transistor having an inherent interelectrode capacitance, a capacitor of value equal to the inherent capacitance, and a tapped winding connected in a cancellation circuit which, when the transistor is off, produces zero bias effect on the transistor. However, in response to an input trigger signal which tends to turn on the transistor, the capacitor discharges and aids the turning-on process of the transistor. In addition, the tapped winding of the cancellation circuit now assumes the role of a sustaining element and maintains the transistor in a conductive condition during one-half cycle of an LC series resonant timing circuit which is connected in common to the horizontal gates of the translator matrix. A desired current pulse configuration is thus produced at a selected matrix cross-point by a new and novel translator circuit operation that is more effective and efficient than translator circuits known to the art heretofore.

It is to be understood that the above-described arrangements are illustrative of the application of the principles of my invention. Numerous other arrangements may be devised by those skilled in the art without departing from the spirit and scope of this invention.

What is claimed is:

1. In a translator having a plurality of cross-point circuits connected in a matrix array defined by horizontal and vertical coordinate leads connected respectively to a first and a second plurality of drive gates, the combination comprising a current source connected to said first plurality of gates, timing means having a predetermined timing control interval and connected between ground and said second plurality of gates, said timing means including a resonant circuit having an inductor and a capacitor connected in series, means for selectively activating one each of said first and second plurality of gates and said timing means, a current carrying path from said source to ground including said selected gates and a cross-point circuit associated with said selected gates, and means in said selected gates cooperating with said timing means resonant circuit for establishing a nonconductive condition in said gates simultaneously with the termination of said predetermined interval in said timing means.

2. In a translator in accordance with claim 1, said timing means further comprising a normally closed switching means shunted across said capacitor, means applying pulses to said switching means, and said switching being responsive to said pulses for opening said shunt across said capacitor.

3. In a translator having a plurality of cross-point circuits connected in a matrix array defined by horizontal and vertical coordinate leads connected respectively to a first and second plurality of drive gates, the combination comprising a current source connected to said first plurality of gates, resonant circuit means having a predetermined resonant period connected in a common ground return path for all of said cross-point circuits, and means for selectively activating one each of said first and second plurality of gates and said resonant circuit means.

4. A translator matrix having cross-point circuits interconnecting a first and second plurality of gates and comprising a potential source common to all of said cross-point circuits, passive circuit means having a resonant preiod of predetermined duration and connected in a common ground return path for all of said cross-point circuits, and means for establishing current flow from said source through one only of said cross-point circuits for an interval controlled as a function of one-half of the resonant period of said passive circuit means, the last-mentioned means including means for selectively activating one each of said first and second plurality of gates connected to said one cross-point circuit.

5. A translator matrix having cross-point circuits interconnecting a first and a second plurality of gates, said matrix comprising a potential source connected to said first plurality of gates, a ground return path common to all of said cross-points and connected to said second plurality of gates, means selectively applying activating signals to inputs of one each of said first and second plurality of gates, a current carrying path from said potential source to ground including said selected gates and one cross-point circuit connected between said selected gates, and means in each of said selected gates responsive to said current flow through said current carrying path for maintaining said gates in a conductive condition during a predetermined time interval in the absence of said signals at the input of said selected gates.

6. A translator comprising a plurality of coordinate drive gates, a plurality of two-terminal cross-point circuits connected in a matrix array to said drive gates, a source of activating pulses, each of said drive gates including a transistor having first, second, and third electrodes, an inherent interelectrode capacitance between said first and second electrodes, a distinct capacitor in each of said gates substantially equal in value to said inherent transistor capacitance, means in each of said gates connecting said distinct capacitor thereof between said first and second electrodes thereof, a direct current potential source, means connecting said potential source across a matrix series circuit including the first and second electrodes of transistors in said pair of gates and including said selected cross-point and means applying control signals to the third electrodes of transistors in said pair of drive gates for establishing a conductive condition in said pair of gates and said selected cross-point circuit.

7. A translator in accordance with claim 6 wherein one gate of said pair of gates comprises a coil in said means connecting said distinct capacitor, said coil having an adjustable tap connected in said series circuit to said potential source for adjusting the division of current from such source between said distinct capacitor and said inherent capacitance.

8. A translator in accordance with claim 7 and further comprising means for regulating the time duration of the conductive condition established through said cross-point circuit, said regulating means including a first inductive means connected in series with a parallel circuit comprising a normally closed switch means and a second distinct capacitor, a source of pulses, and means applying said pulses to open said switch means for activating said regulating means prior to the application of said control signals to said pair of drive gates.

9. A translator in accordance with claim 8 wherein each said two-terminal cross-point circuit includes second inductive means having an inductance larger than said first inductive means, said second inductive means being inductively coupled to a normally high impedance device, said device being settable to a low impedance state in response to a predetermined voltage for establishing a short circuit condition across said second inductive means, said first inductive means and said second distinct capacitor being responsive to the establishment of said short circuit condition for establishing a signal of half sine wave duration across said selected cross-point circuit.

10. A translator matrix comprising, a first and second plurality of coordinate gates having input, output, and control leads, a source of power connected in common to ie input leads of said first plurality of gates, a timing network having one terminal connected in common to the output leads of said second plurality of gates, cross-point means interconnecting the output leads of said first plurality of gates and the input leads of said second plurality f gates in a matrix array, a pulse source, means responsive to a pulse from said source selectively activating a control lead of one each of said first and second plurality f gates to enable conduction in such gates, means applying pulses from said source to said timing network, said timing network operating in response to such pulses to effect control of the duration of each conduction interval in said matrix array, and means in each of said gates sustaining said gates in a conductive condition after termination of a pulse from said source and during said conduction interval.

11. A translator matrix in accordance with claim 10 wherein said timing network comprises a resonant circuit including an inductor and capacitor connected in series between said one common terminal and ground and responsive to said conduction to fix the termination time of said interval.

12. A translator matrix in accordance with claim 11 wherein said timing network further comprises a normally closed switching means connected in shunt across said capacitor, said switching means being responsive to said pulses applied to said timing network for opening said switching means for an interval at least equal to one-half of the resonant period of said resonant circuit.

13. In a translator, a first and second plurality of gates having input and output leads, said output leads of said first plurality of gates interconnected by cross-point devices in a matrix array with said input leads of said second plurality of gates, each of said gates having an inherent capacitance and also including a distinct capacitor equal in value to said inherent capacitance, a potential source connected in common with an input lead of each of said first plurality of gates, a timing network connected in common with an output lead of each of said second plurality of gates, inductive means in each of said gates, a current path from said source including said inductive means and said distinct capacitor for establishing a charge on said distinct capacitor, a source of activating signals, control means in each of said gates for maintaining said gates in a nonconductive condition in the presence of said charged capacitors and in the absence of an activating signal on said control means, means for selectively applying activating signals to the control means of one gate each from said first and second plurality of gates and to said timing network, and means including said inductive means in said selected gates and said activated timing network for regulating the conductive time interval of said selected gates.

14. A translator in accordance with claim 13 wherein said control means in each of said selected gates comprises a first winding and resistance means connected in parallel with said first winding for biasing said gate into partial conduction in the presence of an activating signal on said first winding, said charged distinct capacitors in said selected gates being responsive to said partially conductive condition for discharging through said gate whereby said gate is biased into a fully conductive condition.

15. A translator matrix comprising horizontal and vertical gates each having input, output, and control leads, a potential source connected in common to the input leads of said vertical gates, timing means connected in common to the output leads of said horizontal gates, means interconnecting the output leads of said vertical gates to the input leads of said horizontal gates, a source of activating pulses, means for selectively applying activating pulses from said source substantially simultaneously to a control lead of one each of said horizontal and vertical gates and to said timing network, said gates each having a first transformer winding and an inherent capacitance in a current carrying path between said input and output leads, means in each of said gates including a second transformer winding and a capacitor equal in value to said inherent capacitance connected to shunt said first winding and capacitance, and means in each of said gates inductively coupled to said first and second windings with opposite sense and operable in conjunction with said activated timing network for regulating the conductive time interval of said selected gates.

16. A translator matrix comprising a first and second plurality of gates, a potential source connected to said first plurality of gates, each of said first plurality of gates including a transistor having collector, emitter, and base electrodes and an inherent interelectrode capacitance between the collector and emitter electrodes, first inductive means connecting said inherent capacitance in a current carrying path with said potential source, second inductive means connected between said base and emitter electrodes of said transistor and inductively coupled with said first inductive means, said second inductive means being responsive to current flow through said first inductive means for tending to establish a conductive condition in said transistor, a capacitor equal in value to said inherent capacitance, third inductive means connected in a series circuit with said capacitor, and means connecting said series circuit in a current carrying path between said potential source and said inherent capacitance for canceling out the tendency of said second inductive means to establish a conductive condition in said transistor, timing means connected to said second plurality of gates, means interconnecting said first and second plurality of gates, means for selectively activating one gate each from said first and second plurality of gates, and means including said timing network for regulating the conductive time interval in said transistors of said selected gates.

17. In a translator matrix, a first and second plurality of gates having input and output leads, a potential source connected between ground and a common junction of the input leads of said first plurality of gates, a timing network connected between ground and a common junction of the output leads of said second plurality of gates, said timing network comprising an inductor and capacitor connected in series, means interconnecting said first and second plurality of gates, each of said gates including a first winding having outer terminals and an intermediate tap terminal defining two portions of said first winding, means connecting said gate input lead to said tap terminal, an inherent capacitor between one outer terminal of said winding and said output lead for completing a path for current from said source through one portion of said winding, a second winding inductively coupled to said first winding and responsive to current flow through said one portion of said first winding for tending to establish a conductive condition in said gates, a second capacitor equal in value to said inherent capacitance connected between the remaining outer terminal of said first winding and said output lead, said second capacitor completing a path for current from said source through the remaining portion of said first winding for inductively canceling out, in said second winding, the effect of current flow through said one portion of said first winding, means for selectively activating one each of said first and second plurality of gates, and means including said first and second windings and said timing network for limiting the conductive interval of said selected gates to one half the resonant period of said series connected capacitor and inductor.

18. In a translator having a plurality of cross-point circuits connected in a matrix array defined by horizontal and vertical coordinate leads connected respectively to a first and a second plurality of drive gates, a combination comprising a current source connected to said first plurality of gates, timing means having a predetermined timing control interval and connected between ground and said second plurality of gates, means selectively activating one each of said first and second plurality of gates and said timing means, said activating means activating such gates for a time of shorter duration than said interval, a current carrying path from said source to ground including said selected gates and a cross-point circuit between such gates in said path, winding means in each of said gates in said current carrying path, and control means inductively coupled to said winding means in each of said gates and cooperating with such winding means to cause the conduction condition of such gate to continue during said interval.

References Cited by the Examiner

UNITED STATES PATENTS

| | | | |
|---|---|---|---|
| 3,081,405 | 3/1963 | Hovey et al. | 340—147 |

| | | | |
|---|---|---|---|
| 3,098,216 | 7/1963 | Samwell | 340—16 |
| 3,176,273 | 3/1965 | Deller et al. | 340—16 |

OTHER REFERENCES

German spec. 1,066,615, Oct. 8, 1959 (1 sht. dwg. only no spec. relied on).

NEIL C. READ, *Primary Examiner.*

L. A. HOFFMAN, H. PITTS, *Assistant Examiners.*